United States Patent

Kynl, deceased

Patent Number: 5,131,258

Date of Patent: *Jul. 21, 1992

[54] PUNCH ANVILS FOR SHEET FASTENING SYSTEMS

[75] Inventor: Miroslav Kynl, deceased, late of Hamilton, Canada, by Olga Kynl, executrix

[73] Assignee: BTM Corporation, Marysville, Mich.

[*] Notice: The portion of the term of this patent subsequent to Jul. 16, 2008 has been disclaimed.

[21] Appl. No.: 730,357

[22] Filed: Jul. 15, 1991

Related U.S. Application Data

[60] Division of Ser. No. 518,250, May 4, 1990, Pat. No. 5,031,442, which is a continuation of Ser. No. 240,460, Sep. 6, 1988, abandoned, which is a continuation of Ser. No. 862,911, May 14, 1986, abandoned.

[30] Foreign Application Priority Data

Jun. 3, 1985 [CA] Canada .................................. 483079

[51] Int. Cl.⁵ .............................................. B21D 39/03
[52] U.S. Cl. .......................................... 72/465; 72/395
[58] Field of Search ............... 29/243.53, 283; 72/363, 72/395, 465, 478; 279/35, 36; 24/205

[56] References Cited

U.S. PATENT DOCUMENTS

| | | |
|---|---|---|
| 988,154 | 3/1911 | Thiemer . |
| 1,283,799 | 11/1918 | Kerr . |
| 1,509,997 | 9/1924 | Fry . |
| 2,555,836 | 6/1951 | Werich . |
| 2,619,855 | 12/1952 | Williams . |
| 2,671,361 | 3/1954 | Sandberg . |
| 2,685,719 | 8/1954 | Golden . |
| 2,924,312 | 2/1960 | Williams . |
| 4,208,776 | 6/1980 | Schleicher . |
| 4,459,735 | 7/1984 | Sawdon . |
| 4,757,609 | 7/1988 | Sawdon . |

FOREIGN PATENT DOCUMENTS 2069394 2/1981 United Kingdom .

Primary Examiner—Lowell A. Larson
Attorney, Agent, or Firm—Harness, Dickey & Pierce

[57] ABSTRACT

A new punch anvil is provided for use with an axial punch for use in a fastening system of the kind in which the punch displaces a portion of one sheet member, such as a thin metal sheet, into another sheet to fasten them together, the punch and die cooperating to form a "button" of sideways displaced material that locks the sheets together. The anvil consists of two parts, one of which is of smaller transverse dimension than the other to form a transverse shoulder between them. The anvil end against which the members are clamped to be punched is surrounded by a jaw which is split longitudinally to be in at least two members held assembled by an encircling resilient ring or collar, so that the jaw members can move apart transversely and/or their upper ends in contact with the clamped members can rock apart on the shoulder to release them upon conclusion fo the fastening operation. The jaw members are retained on the anvil as the punch withdraws by an annular ridge cooperating with an annular groove or by two radial pins. The longitudinal position of the anvil member may be adjusted to correspond with the punch stroke by means of a screw-threaded member in a correspondingly internally screw-threaded counter-bore.

9 Claims, 2 Drawing Sheets

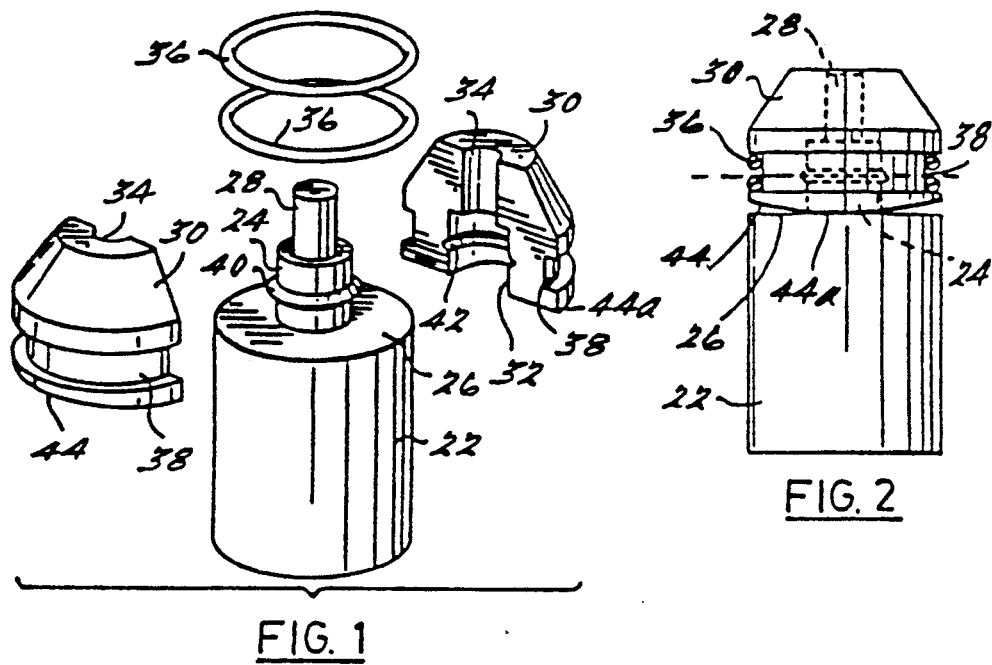
FIG. 1
FIG. 2
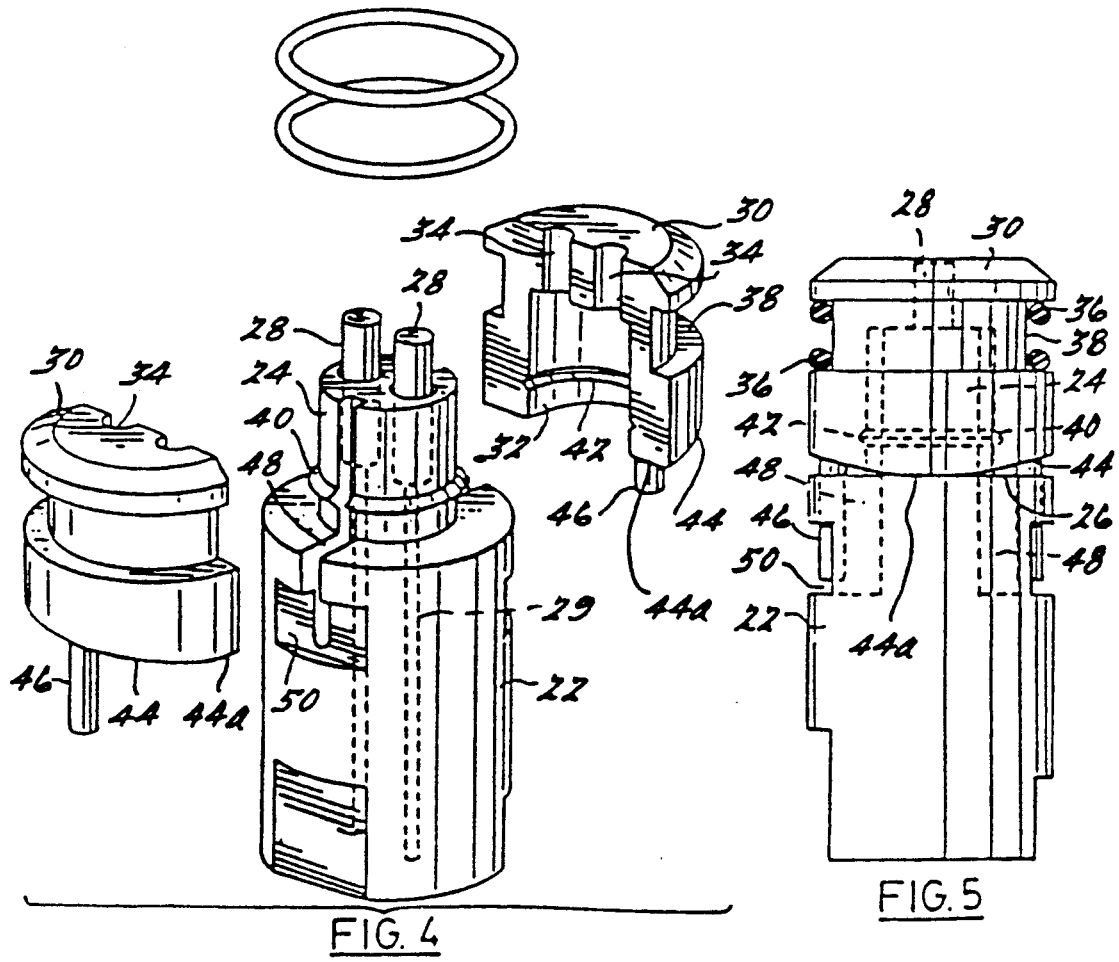
FIG. 4
FIG. 5

PUNCH ANVILS FOR SHEET FASTENING SYSTEMS

This is a divisional application of copending U.S. patent application Ser. No. 518,250, filed May 4, 1990, now U.S. Pat. No. 5,031,442 granted July 16, 1991, which was a continuation of U.S. patent application Ser. No. 240,460, filed Sept. 6, 1988, abandoned, which was in turn a continuation of U.S. patent application Ser. No. 862,911, filed May 14, 1986, abandoned.

FIELD OF THE INVENTION

This invention relates to a new punch anvil, such as is used for example in metal fastening systems of the kind in which metal is displaced from one sheet metal member into another sheet metal member to hold the two of them together by means of a punch operation performed between a punch and the punch anvil.

REVIEW OF THE PRIOR ART

There is a continuing and increasing interest in sheet fastening systems of the kind in which, for example, two or more thin metal sheets are fastened securely together by punching part of one sheet into the other sheet. Such a system typically employs a metal rod-like punch which cooperates with a hollow anvil having openable jaws, the metal sheets to be fastened together resting on the anvil while the punch is brought forcefully into contact with the sheets to drive respective small portions of the sheets, corresponding in shape to the punch end, into an aperture in the anvil, so that the portion of the top sheet first contacted by the punch is driven through the underlying sheets into the anvil aperture, and preferably is caused to spread out radially so as to provide a more secure fastening. In many applications it is preferred that the punching does not perforate or crack the sheets, so that the fastening is fluid-tight. The punch is then withdrawn and the fastened sheets released from the anvil, the jaws of which open to facilitate the release. Such systems can replace spot welding systems and have a number of advantages over such welding systems.

DEFINITION OF THE INVENTION

It is an object of the present invention to provide a new punch anvil for use in such sheet fastening operations.

It is another object to provide such an anvil with provision for ready release of the punched material from the anvil.

In accordance with the present invention there is provided a punch anvil for use with a punch in a sheet fastening operation in which two sheet members to be fastened together are punched during a punch operation between the punch and the punch anvil moving in a longitudinal direction relative to one another, the punch anvil comprising:

an anvil body having a first body portion and a second body portion longitudinally disposed with respect to one another;

the second body portion being of reduced transverse dimension relative to the first body portion to provide a shoulder between them extending transversely of the longitudinal direction;

the second body portion having an anvil member for cooperation with a punch member;

a jaw comprising at least two jaw members separate from one another in a respective longitudinal plane or planes and surrounding the second body portion and the anvil member, the members having a bore therebetween for reception during the punch operation of the punch and the corresponding parts of the sheet members to be joined;

the jaw members engaging the said transverse shoulder at least during the punch operation and being supported thereby against the longitudinal force of the operation and against longitudinal movement, the members also being supported thereby during the punch operation for both rocking movement toward and away from one another and lateral displacement transversely outward away from the anvil;

means for retaining the jaw members against longitudinal movement with the punch relative to the second body portion upon withdrawal of the punch; and resilient retaining means urging the jaw members transversely inward toward the second body portion and the anvil while permitting the said rocking movement and lateral displacement thereof.

DESCRIPTION OF THE DRAWINGS

Punch anvils which are particular preferred embodiments of the invention will now be described, by way of example, with reference to the accompanying diagrammatic drawings wherein:

FIG. 1 is an exploded view of a first single punch embodiment;

FIG. 2 is a side elevation of the embodiment of FIG. 1 in assembled condition;

FIG. 4 is an exploded view of a second dual punch embodiment;

FIG. 5 is a side elevation of the embodiment of FIG. 4 in assembled condition;

Similar parts are given the same reference number in all the figures of the drawings, whereverthat is possible.

DESCRIPTION OF THE PREFERRED EMBODIMENTS

Figure 7:
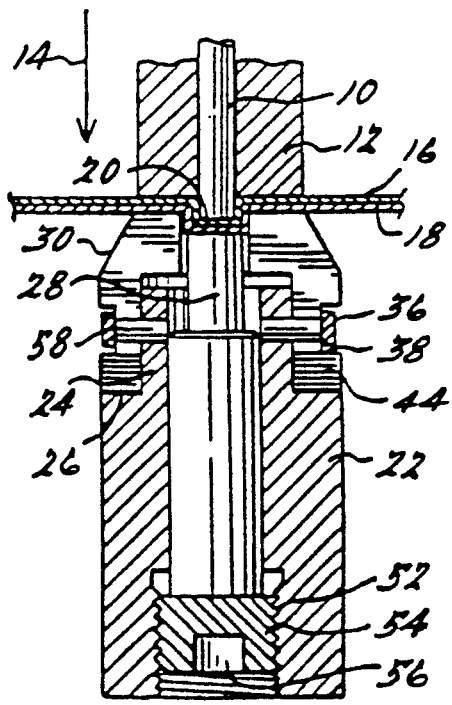
FIG. 7 is a longitudinal cross-section through a third embodiment.

Referring initially to FIG. 7, a punch anvil of the invention typically cooperates with a punch 10 and a clamp and stripper member 12, the punch moving in a longitudinal direction indicated by the arrow 14 to punch a depression in a plurality (only two shown) of superimposed layers 16 and 18, which usually are of metal, while they are held by the clamp member 12 against the anvil. The punch draws a portion 20 of the top layer 16, of shape corresponding to the shape of the end of the punch, through the other layer or layers and fastens them together. Thus, the punch first draws and then compresses the material of the sheets reducing its thickness, resulting also in lateral displacement of the material to form an underlying "button" of larger diameter than the original draw which forms the fastening. It is important in many applications that the metal sheets are not cracked or perforated by this operation so that a fluid-tight fastening is obtained, e.g. in the joining of the parts of air conditioning ducts.

Figure 3:
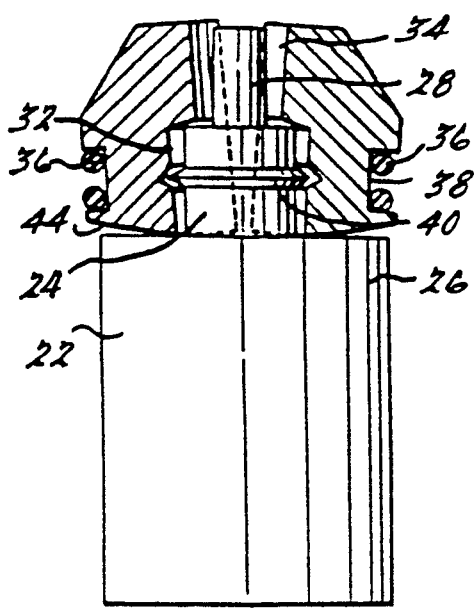
FIG. 3 shows the embodiment of FIGS. 1 and 2 with the upper movable portion thereof in longitudinal cross-section to illustrate its operation.

Referring now to FIGS. 1 to 3, a single punch anvil which is a first embodiment of the invention has an anvil body comprising a cylindrical first body portion 22 and a longitudinally disposed cylindrical second body portion 24 of reduced diameter, so that a flat, transversely extending annular shoulder 26 is formed between them. The second body portion has a longitudinal coaxial bore therein which receives with a snug fit replaceable anvil member 28 having an upper anvil end of corresponding diameter. Bores 29 are provided for passage of a tool for removing the anvil when required.

The upper end of the punch anvil is provided with a longitudinally split cylindrical jaw, consisting in this embodiment of two equal jaw members 30 butting against one another in a corresponding longitudinal plane, the jaws surrounding the second upper body portion 24 and the reduced diameter anvil member 28. Thus, each jaw member has the respective half of an enlarged counter-bore 32 that permits it to surround the upper body portion 24, and a smaller diameter bore 34 that receives the anvil member 28 and the punch 10. The jaw is, in this embodiment, held assembled around the second portion 24 by two complete retaining rings 36 of resilient material that are engaged in a circumferential groove 38 in the exterior wall of the jaw member. It is found that commercial O-rings of appropriate diameters are very suitable for this purpose. The upper body portion 24 is provided with a transversely protruding circumferential ridge 40 which engages with clearance in a circumferential groove 42 in the wall of the counter-bore 32, the ridge and groove together constituting longitudinal retaining means that retain the jaw member against longitudinal movement on the upper portion 24, especially while the punch 10 is being withdrawn.

Figure 6:
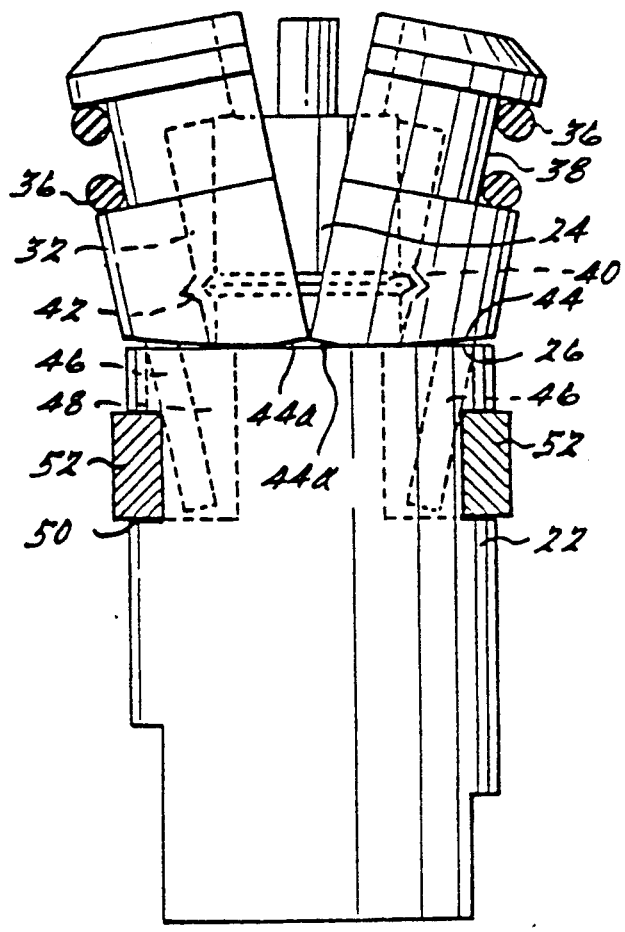
FIG. 6 is another side elevation of the embodiment of FIGS. 4 and 5 illustrating an aspect of its operation.

In this embodiment the lower circumferential faces 44 of the jaw members are formed convexly on a radius by a generator line parallel to and centered in the plane in which the jaw is divided. The portion of each face 44 close to the dividing plane is always in contact with the surface 26 and, as is shown in FIG. 6, may be formed as a flat portion 44a, supporting the respective jaw member against the longitudinal pulsating forces applied thereto by the clamp 12 and the punch 10. However, the two parts of the jaw are able to move apart during the punching operation against the inward urging of the rings 36 to accommodate the sideways deformation of the metal sheets 16 and 18 that takes place by the action of the punch 10 against the anvil member 28 to form a "button", as described above. As is illustrated by FIG. 3, this transverse outward movement could be by pure translational movement of the jaw parts, or by pure rocking (pivotal) movement, but more usually will be some combination of the two, so that the movement can automatically adjust itself to accommodate readily to differences in the thicknesses and the ductility of the materials being joined, thereby facilitating the formation of a secure joint without cracking or perforation of the metal sheets at the joint. Thus, with thin sheets the movement is more likely to be predominantly rocking, while with thicker sheets, or a larger number of sheets, more translational movement may be obtained. As the punch is withdrawn the engagement between the ridge 40 and groove 42 ensures that the jaw is retained against longitudinal movement with the punch, the encircling retaining rings 36 being sufficiently strong to ensure that enough engagement is maintained for this purpose.

It will be noted that in this embodiment the grooves 38 and 42 and the ridge 40 are substantially symmetrical about the same horizontal transverse plane parallel to the shoulder 26, and they are located in the lower portion of the jaw, thus facilitating the tilting or rocking of the jaw members, which is the preferred type of movement for release of the joint after its formation, but without preventing any of the translational movement of the jaw members that may be required.

It will be seen therefore that I have provided a new punch anvil of simple but flexible design permitting ready and automatic functioning of the anvil to accommodate different thicknesses of material to be fastened, and also enabling rapid replacement of the various parts, such as the anvil body 28 and the jaw members 30, as they become worn in use, because of its simple assembly and disassembly. By permitting the jaw members to "float" relatively freely supported on the shoulder in the manner described there are no pivots to which the punching force can be applied, which pivots are a potential source of breakage if the jaw members are not properly positioned during the punch stroke.

A multi-punch embodiment is illustrated by FIGS. 4 through 6, in which the second upper body portion 24 receives two transversely spaced parallel anvil pins 28, each being engaged in a respective bore 34 in the jaw members 30, so that two spaced joints can be formed simultaneously. The plane about which the two jaw members 30 separate passes through the longitudinal axes of both pins 28, and the jaw members rock to tilt out of this plane. In addition each jaw member 30 has a longitudinal lever member 46 extending downward through a respective slot 48 in the lower, second body part 22, so that the lever member protrudes into a respective recess 50 in the respective side of the lower first body part 22. As is apparent from a consideration of FIGS. 5 and 6, upon insertion of a fork shaped member 52, or two parallel members 52 into the recesses 50 the lever members 46 are forced inwards toward each other, so that the jaw members are rocked outward away from each other, positively releasing the formed joint, if that should be necessary. It is also sometimes found that the sheets to be joined include a layer of fibrous or shreddable material, and some of this material may be torn from the sheet and becomes lodged between the jaw members, so that the anvil eventually becomes blocked with it. This can be avoided by arranging that at some time during the punch cycle the jaw members are forced open by the action of the members 52 after the formation of the button and any such material blown away by an air blast.

Figure 8:
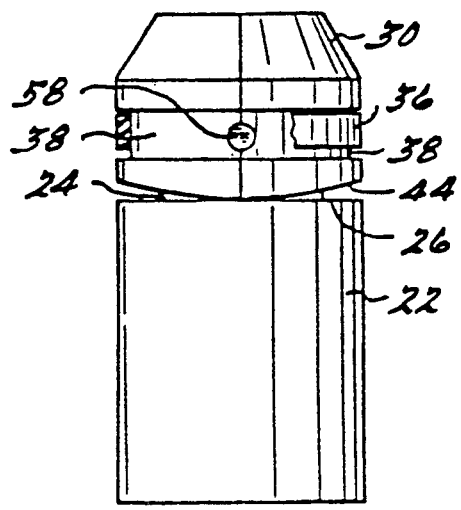
FIG. 8 is a side elevation of the embodiment of FIG. 7 in assembled condition.

A third embodiment is illustrated in FIGS. 7 and 8, the first lower body portion 22 being provided at its lower end with an internally screw-threaded counter-bore 52 in which a grub screw 54 is mounted for longitudinal movement, so as to provide corresponding longitudinal adjustment movement of the anvil body 28. The screw 54 is provided with a recess 56 for receipt of a wrench employed to rotate it. The longitudinal position of the anvil body can thus readily be adjusted to correspond accurately with the depth of stroke required by the punch to form a secure fastening. Also, during manufacture and assembly of the punch anvil, or replacement of a worn anvil member, or repair of a worn anvil member, it is possible to move the anvil member 28 upward until its upper surface is flush with the upper surfaces of the jaw members 30; these flush surfaces can then be machined simultaneously to ensure a desired match as to surface finish and flatness. This structure can of course also be employed in the two first described embodiments.

In this embodiment the retaining ridge and groove of the two prior embodiments are replaced by two coaxial pins 58 which extend radially from the second portion 24 into respective radial bores formed between the jaw members 30, the bores being split together with the jaw members in the same longitudinal plane. The longitudinal axis of the anvil body 28 also lies in this plane. The resilient retaining means 36 comprise a single incomplete ring of spring metal engaged in the groove 38, the ring being shown partly broken away in FIG. 8 to show the end of the pivot pin 58. The ring therefore also serves to retain the two pins against end-wise movement out of their respective bores. Such a ring could also be used in the two prior embodiments, or one or more resilient rings employed in this embodiment.

Although in the embodiments described the surface 26 is flat, while the jaw member surfaces 44 are convexly curved, it will be apparent that the arrangement can be reversed, or both surfaces can be convexly curved. With the embodiments of FIGS. 1 through 6 the retaining means 40 and 42 may have the ridge protruding from the jaw members while the cooperating groove is provided in the second part 24. In all the embodiments described the jaw is separated in a single plane into two jaw members, and this is particularly appropriate with the second multi-punch embodiment with the additional means for forcing the jaw members apart. However, in other embodiments the jaw may be split longitudinally in more than one plane to provide three or more jaw members.

I claim:

1. An apparatus for use in an operation for joining two or more sheet material items, the apparatus comprising:
    punch means;
    a die assembly including a number of die members defining an opening therebetween for receiving said punch means for forcibly deforming portions of said sheet material items when said punch means is moved relatively toward said die assembly generally along a longitudinal axis with said sheet material items disposed therebetween, said die members being movable in directions transverse to said longitudinal axis toward and away from one another between closed and open positions;
    said die assembly further including a body portion having transversely-extending surface portions thereon, said die members being supported on said shoulder portion during said deformation of said sheet material portions, said die members each having a surface extending generally transversely relative to said longitudinal axis, said transversely-extending surfaces of said die members being engageable with said transversely-extending surface portions of said body portion;
    anvil means located in said opening, said die members being movable transversely away from one another in response to at least a part of said sheet material portions being deformed transversely outwardly between said punch means and said anvil means, said transversely-extending surfaces of said die members being non-coplanar with said transversely-extending surface portions of said body during at least a portion of said joining operation; and
    resilient biasing means for resiliently biasing said die members toward one another.

2. An apparatus according to claim 1, wherein said transversely-extending surfaces of said die members are non-coplanar with said transversely-extending portions of said body when said die members are in their closed positions.

3. An apparatus according to claim 1, wherein said transversely-extending surfaces of said die members are non-coplanar with said transversely-extending portions of said body when said die members are in their open positions.

4. An apparatus according to claim 1, further including stripper means for separating said deformed portions of said sheet material items from said punch means as said punch means is moved relatively away from said die assembly.

5. An apparatus according to claim 1, further including a generally annular lateral protrusion on one of said die assembly and said die members, and a generally annular lateral recess on the other of said die assembly and said die members, said annular protrusion being interferingly engageable with said annular recess to substantially restrain said die members longitudinally relative to said die assembly.

6. An apparatus according to claim 1, wherein said resilient biasing means is composed of an elastomeric material and engages outer peripheral portions of said die members.

7. An apparatus according to claim 1, wherein said resilient biasing means is composed of an elastic metallic material and engages outer peripheral portions of said die members.

8. An apparatus according to claim 1, wherein said resilient biasing means includes an elastomeric member substantially surrounding said die members and engaging outer peripheral portions of said die members.

9. An apparatus according to claim 1, wherein said resilient biasing means includes an elastic metallic member substantially surrounding said die members and engaging outer peripheral portions of said die members.

* * * * *

UNITED STATES PATENT AND TRADEMARK OFFICE
CERTIFICATE OF CORRECTION

PATENT NO. : 5,131,258

DATED : July 21, 1992

INVENTOR(S) : Miroslav Kynl

It is certified that error appears in the above-identified patent and that said Letters Patent is hereby corrected as shown below:

ON THE TITLE PAGE

In the Abstract, line 16, "fo" should be -- of --.

Signed and Sealed this

Twenty-first Day of September, 1993

Attest:

BRUCE LEHMAN

*Attesting Officer*    *Commissioner of Patents and Trademarks*